United States Patent
Hassan Hussein et al.

(10) Patent No.: US 12,464,558 B2
(45) Date of Patent: Nov. 4, 2025

(54) APPARATUS, BASE STATION AND METHODS ALLOWING RELIABLE WIRELESS COMMUNICATION

(71) Applicant: KONINKLIJKE PHILIPS N.V., Eindhoven (NL)

(72) Inventors: Khaled Shawky Hassan Hussein, Erlangen (DE); Thomas Haustein, Potsdam (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/769,743

(22) Filed: Jul. 11, 2024

(65) Prior Publication Data
US 2024/0373454 A1 Nov. 7, 2024

Related U.S. Application Data

(63) Continuation of application No. 18/126,499, filed on Mar. 27, 2023, now Pat. No. 12,052,751, which is a
(Continued)

(30) Foreign Application Priority Data

Jun. 29, 2017 (EP) .................................. 17178873

(51) Int. Cl.
*H04L 5/00* (2006.01)
*H04W 72/0446* (2023.01)
(Continued)

(52) U.S. Cl.
CPC ......... *H04W 72/569* (2023.01); *H04L 5/0048* (2013.01); *H04L 5/0053* (2013.01);
(Continued)

(58) Field of Classification Search
CPC .............. H04W 72/56; H04W 72/569; H04W 72/0446; H04W 84/18
See application file for complete search history.

(56) References Cited

U.S. PATENT DOCUMENTS 10,652,954 B2 5/2020 Wei
11,632,771 B2 * 4/2023 Hassan Hussein ... H04W 72/56
370/329
(Continued)

FOREIGN PATENT DOCUMENTS

EP 3270634 A1 1/2018
WO 2016022849 A1 2/2016
(Continued)

OTHER PUBLICATIONS

3GPP TSG-RAN WG1#85, R1-165075 Title:Support of SRS transmission switching (Year: 2016).*
(Continued)

*Primary Examiner* — Faruk Hamza
*Assistant Examiner* — Abusayeed M Haque

(57) ABSTRACT

An apparatus configured to operate in a wireless communication network by generating and transmitting a first wireless signal using a resource element allocated to the apparatus is configured to receive a second wireless signal and to determine that the second wireless signal is to be forwarded within the wireless communication network. The apparatus is configured to transmit a third wireless signal based on the second wireless signal instead of the first wireless signal using the allocated resource element of the wireless communication network.

17 Claims, 14 Drawing Sheets

Related U.S. Application Data continuation of application No. 16/719,720, filed on Dec. 18, 2019, now Pat. No. 11,632,771, which is a continuation of application No. PCT/EP2018/066537, filed on Jun. 21, 2018.

(51) Int. Cl.
*H04W 72/23* (2023.01)
*H04W 72/56* (2023.01)
*H04W 72/566* (2023.01)
*H04W 84/18* (2009.01)

(52) U.S. Cl.
CPC ....... *H04W 72/0446* (2013.01); *H04W 72/23* (2023.01); *H04W 72/56* (2023.01); *H04W 84/18* (2013.01)

(56) References Cited

U.S. PATENT DOCUMENTS

| | | | |
|---|---|---|---|
| 12,052,751 B2* | 7/2024 | Hassan Hussein ... | H04W 72/23 |
| 2014/0369268 A1* | 12/2014 | Huang ................... | G16H 40/67 |
| | | | 370/329 |
| 2017/0230939 A1 | 8/2017 | Rudolf | |
| 2017/0295531 A1 | 10/2017 | Singh | |
| 2017/0331577 A1 | 11/2017 | Parkvall | |
| 2017/0331670 A1 | 11/2017 | Parkvall | |
| 2017/0359116 A1 | 12/2017 | Hwang et al. | |
| 2018/0027429 A1 | 1/2018 | Li | |
| 2018/0049259 A1 | 2/2018 | Aminaka et al. | |
| 2018/0054788 A1 | 2/2018 | Kwon | |
| 2018/0103485 A1* | 4/2018 | Jiang ................. | H04W 72/1268 |
| 2018/0184270 A1 | 6/2018 | Chun | |
| 2018/0213379 A1 | 7/2018 | Xiong et al. | |
| 2018/0234995 A1 | 8/2018 | Jung et al. | |
| 2018/0249423 A1* | 8/2018 | Garcia ................. | H04B 17/373 |
| 2019/0014563 A1 | 1/2019 | Lee | |
| 2019/0014606 A1 | 1/2019 | Li | |
| 2019/0045469 A1 | 2/2019 | Zhang | |
| 2019/0110224 A1 | 4/2019 | Yasukawa | |
| 2019/0116609 A1 | 4/2019 | Feng | |
| 2019/0182827 A1* | 6/2019 | Wang ................... | H04W 72/20 |
| 2019/0200370 A1 | 6/2019 | Yang et al. | |
| 2019/0253869 A1 | 8/2019 | Xu et al. | |
| 2020/0021355 A1 | 1/2020 | Pinheiro | |
| 2020/0305038 A1 | 9/2020 | Tooher | |
| 2020/0322924 A1* | 10/2020 | Kim ....................... | H04W 72/02 |

FOREIGN PATENT DOCUMENTS

| | | |
|---|---|---|
| WO | 2016142974 A1 | 9/2016 |
| WO | 2016155018 A1 | 10/2016 |
| WO | 2017026844 A1 | 2/2017 |
| WO | 2017055482 A1 | 4/2017 |

OTHER PUBLICATIONS

3GPP TSG RAN WG1#110, R1-2205992 Title: Discussion on physical channel design of sidelink on unlicensed spectrum (Year: 2022).*

ITRI: Separations of Resource AI location for relay related/non-relay related Sidelink Discovery, vol. RAN WG2, No. St. Julian; Feb. 15-19, 2015; XP051074731, Retrieved from the Internet: URL:http://www.3gpp.org/ftp/Meetings -3GPP - SYNC/RAN2/Docs/ [retrieved on J016-02-14], Feb. 14, 2016, 4 pages.

Kyocera: Consideration of bearer mapping for Prose UE-to-Network Relays, vol. RAN WG2, No. Malmo, Sweden; Oct. 5-9, 2015, XP051005184, Retrieved from the Internet: URL:http://www.3gpp.org/flp/Meetings -3GPP- Sync/RAN2/Docs/; [retrieved on Oct. 4, 2015], Oct. 4, 2015, 7 pages.

Nokia et al Semi-persistent Scheduling for 5G New Radio URLLC vol. RAN WGI Lisbon, Portugal, Oct. 10-14, 2016.

Sony: Update to Solution 6.1.5, vol. SA WG2, No. San Jose del Caba, Mexico; Jun. 26-30, 2017; XP051303025, Retrieved from the Internet: URL:http://www.3gpp.org/ftp/Meetings -3GPP -SYNC/SA2/Docs/ retrieved on Jun. 25, 2017], Jun. 25, 2015, 4 pages.

3GPP TS 38.331 3rd Generation Partnership Project: Technical Specification Group Radio Access Network NR. Radio Source Control (RRC) Protocol Specification 2017.

3GPP TS 38.331 3rd Generation Partnership Project: Technical Specification Group Radio Access Network NR. Medium Access Control (MAC) Protocol Specification 2017.

3GPP TSG-RAN WG2 Meeting #92 R2-156584 Title Draft-LS on V2V QoS on Priority Handling (2015).

3GPP TSG-RAN WG2 Meeting 393 R2-162454 SL Resources Allocation in SPS Manner (2016).

* cited by examiner

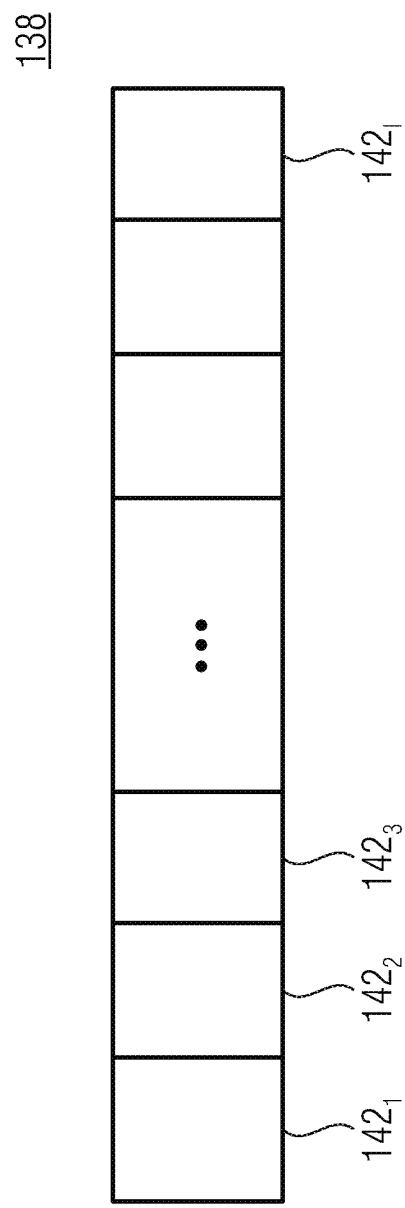

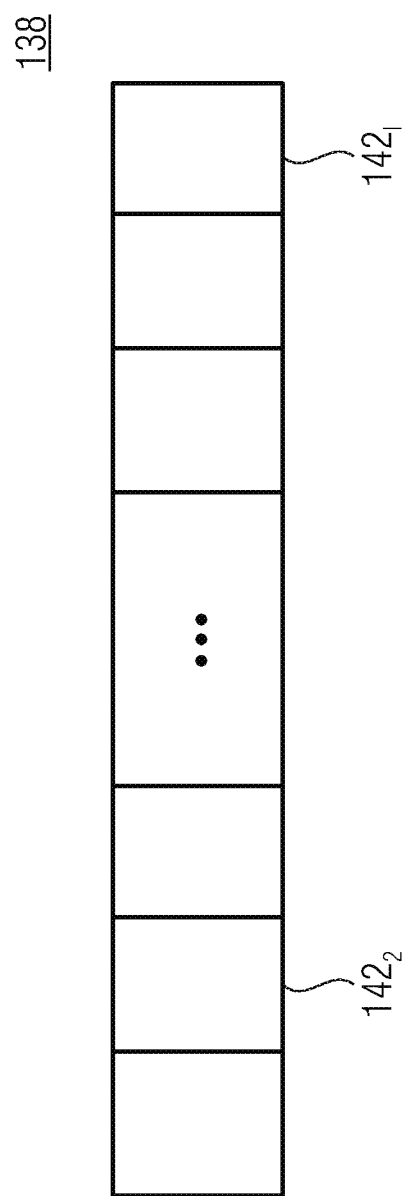

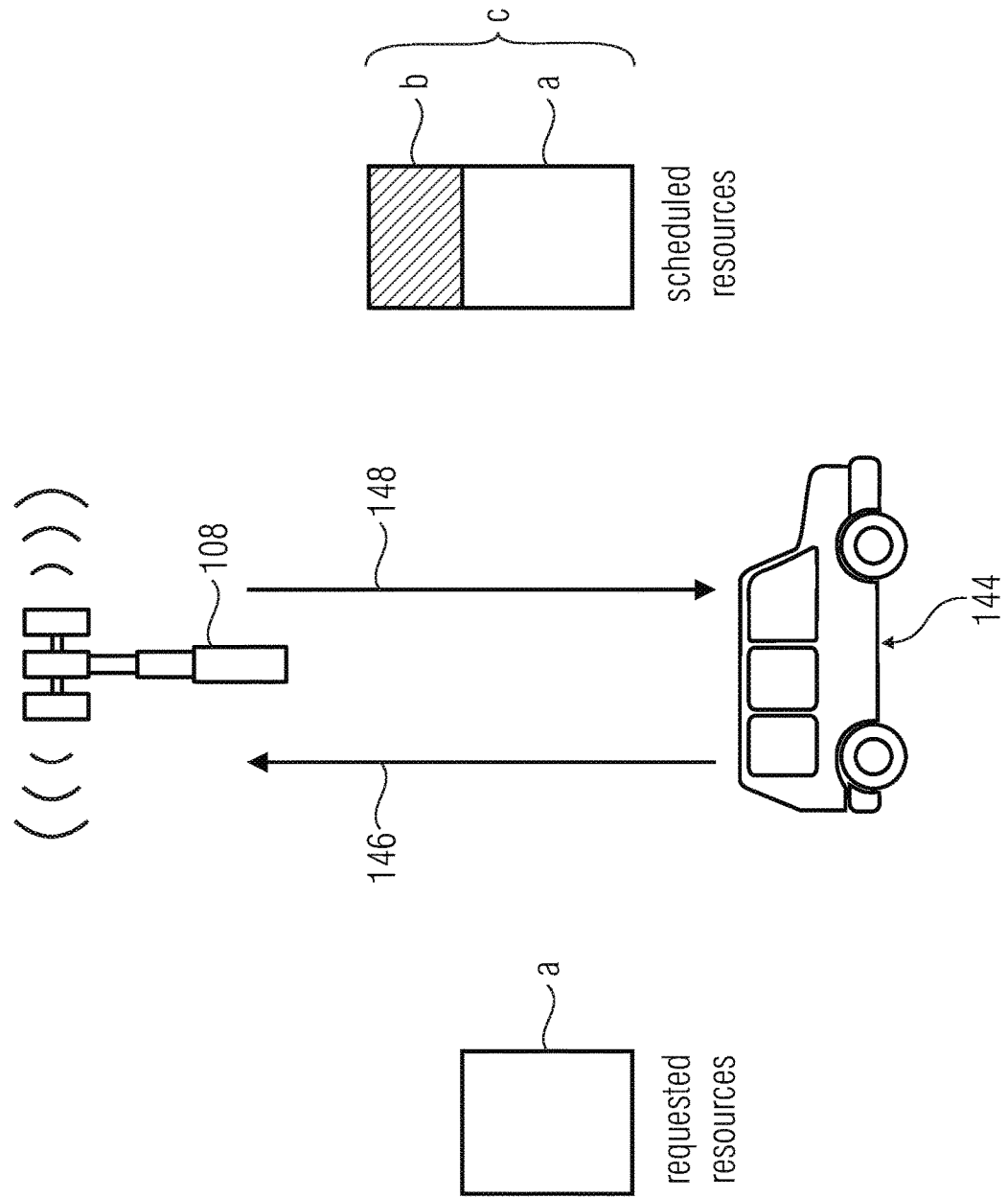

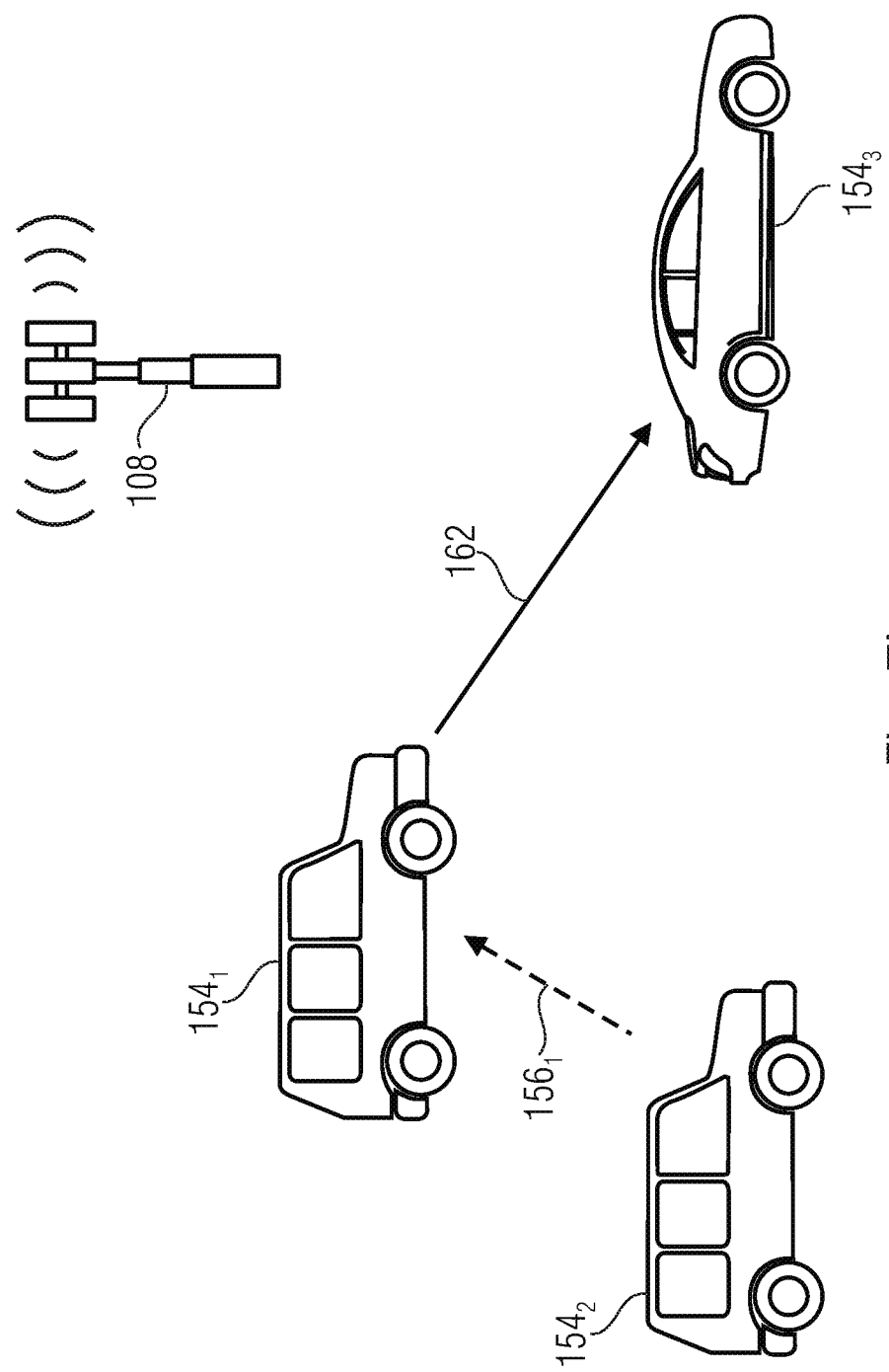

APPARATUS, BASE STATION AND METHODS ALLOWING RELIABLE WIRELESS COMMUNICATION

CROSS-REFERENCE TO RELATED APPLICATIONS

This application is a continuation of U.S. patent application Ser. No. 18/126,499 filed on Mar. 27, 2023 which is a continuation of U.S. patent application Ser. No. 16/719,720 filed Dec. 18, 2019 which is a continuation of International Application No. PCT/EP2018/066537, filed Jun. 21, 2018, which claims the benefit of EP Application No. 17178873.0, filed Jun. 29, 2017, which is also incorporated herein by reference in its entirety.

BACKGROUND OF THE INVENTION

For the new evolving micro-reliable and low latency communication, very robust communication for simultaneously transmitting vehicles in a very short transmission-end-delivery or a round-trip time (RTT), i.e., assuming proper hand shaking, is to be guaranteed. This is not easily achievable with current resource mapping, scheduling, standard capabilities and the existing signalling of the three GPP standardization, see, for example, 3GPP TS 38.321 and 3GPP TS 38.331. The main drawbacks of the current approaches are that:
1. Simultaneously talking vehicles are almost performing a half-duplex communication. Therefore, if two vehicles transmitted on the same time (even on different frequencies), the two vehicle's user-equipment will not be able to decode their intended messages.
2. Reliable communication uses a stable transmission channel or a transmission allowing reliable hand shaking, i.e., via retransmission, which might be difficult for the moving nature of the cars or due to the problem as defined in 1.

Thus, there is a need for enhancing mobile communications.

SUMMARY

An embodiment may have an apparatus configured to operate in a wireless communication network by generating and transmitting a first wireless signal using a re-source element allocated to the apparatus; wherein the apparatus is configured to receive a second wireless signal and to determine that the second wireless signal is to be forwarded within the wireless communication network; wherein the apparatus is configured to transmit a third wireless signal based on the second wireless signal instead of the first wireless signal using the allocated resource element of the wireless communication network.

Another embodiment may have an apparatus configured to operate in a wireless communication network by generating and transmitting a first wireless signal using a resource element allocated to the apparatus; wherein the apparatus is configured to generate and transmit a signal indicating a request that the first wireless signal is to be forwarded by a receiving node that is different from the intended receiver of the first wireless signal.

Another embodiment may have a base station configured to operate a wireless communication network cell by allocating resource elements to an apparatus operated by the base station, wherein the base station is configured to receive, from an apparatus a request for a first amount of resource elements for own communication; wherein the base station is configured to allocate, to the apparatus, a second amount of resource elements, wherein the second amount is higher when compared to the first amount; and wherein the base station is configured to feedback the second amount to the apparatus.

According to another embodiment, a wireless network may have: at least one inventive apparatus as mentioned above; at least a first transmitter configured to transmit a first message using a resource element and a second transmitter configured to transmit a second message using the resource element; wherein the apparatus is configured to receive the first message as the second wireless signal and to transmit the first message as the third wireless signal using a different resource element.

Another embodiment may have a method for operating an apparatus configured to operate in a wireless communication network by generating and transmitting a first wireless signal using a resource element allocated to the apparatus, the method having the steps of: determining that the second wireless signal is to be forwarded within the wireless communication network using a received second wireless signal; transmitting a third wireless signal based on the second wireless signal instead of the first wireless signal using the allocated resource element of the wireless communication network.

Still another embodiment may have a method for operating an apparatus configured to operate in a wireless communication network by generating and transmitting a first wireless signal using a resource element allocated to the apparatus, the method having the steps of: generating and transmitting a sidelink signal through a sidelink channel of the wire-less communication network, the sidelink signal indicating a request that the first wireless signal is to be forwarded by a receiving node that is different from the in-tended receiver of the first wireless signal.

Another embodiment may have a method for operating a base station configured to operate a wireless communication network cell by allocating resource elements to an apparatus operated by the base station, the method having the steps of: receiving, from an apparatus, a request for a first amount of resource elements for own communication; allocating, to the apparatus, a second amount of resource elements, wherein the second amount is higher when compared to the first amount; and feedbacking the second amount to the apparatus.

Another embodiment may have a non-transitory digital storage medium having stored thereon a program for performing a method for operating an apparatus configured to operate in a wireless communication network by generating and transmitting a first wireless signal using a resource element allocated to the apparatus, the method having the steps of: determining that the second wireless signal is to be forwarded within the wireless communication network using a received second wireless signal; transmitting a third wireless signal based on the second wireless signal instead of the first wireless signal using the allocated resource element of the wireless communication network, when said computer program is run by a computer.

Another embodiment may have a non-transitory digital storage medium having stored thereon a program for performing a method for operating an apparatus configured to operate in a wireless communication network by generating and transmitting a first wireless signal using a resource element allocated to the apparatus, the method having the steps of: generating and transmitting a sidelink signal through a sidelink channel of the wire-less communication network, the sidelink signal indicating a request that the first wireless signal is to be forwarded by a receiving node that is different from the in-tended receiver of the first wireless signal, when said computer program is run by a computer.

Another embodiment may have a non-transitory digital storage medium having stored thereon a program for performing a method for operating a base station configured to operate a wireless communication network cell by allocating resource elements to an apparatus operated by the base station, the method having the steps of: receiving, from an apparatus, a request for a first amount of resource elements for own communication; allocating, to the apparatus, a second amount of resource elements, wherein the second amount is higher when compared to the first amount; and feedbacking the second amount to the apparatus, when said computer program is run by a computer.

The inventors have found that wireless communication may be enhanced by allowing for a high reliability of wireless communication and that such a high reliability may be obtained by assigning more resources than requested to a communicating apparatus and/or by introducing a prioritization for message forwarding.

According to an embodiment, an apparatus is configured to operate in a wireless communication network by generating and transmitting a first wireless signal using a resource element allocated to the apparatus. The apparatus is configured to receive a second wireless signal and determine that the second wireless signal is to be forwarded within the wireless communication network. The apparatus is configured to transmit a third wireless signal based on the second wireless signal instead of the first wireless signal using the allocated resource element of the wireless communication network. This allows information contained in the second wireless signal to be forwarded with a high reliability as the apparatus advantageously transmits the third wireless signal when compared to the first wireless signal. Such a de-centralized prioritization allows for a reliable communication in view of forwarding the second signal.

According to an embodiment, an apparatus is configured to operate in a wireless communication network by generating and transmitting a first wireless signal using a resource element allocated to the apparatus. The apparatus is configured to generate and transmit a signal indicating a request that the first wireless signal is to be forwarded by a receiving node that is different from the intended receiver of the first wireless signal. The signal may be transmitted via a so-called side channel allowing for a signalling that the first wireless signal is requested to be forwarded when being received by nodes being not the intended receiver. This allows for a reliable communication as the message may be received from the transmitting apparatus but also from the forwarding apparatus.

According to an embodiment, a base station is configured to operate a wireless communication network by allocating resource elements to an apparatus operated by the base station. The base station is configured to receive a request for a first amount of resource elements from an apparatus which thereby indicates an amount of resources used for its own communication. The base station is configured to allocate, to the apparatus, a second amount of resource element, wherein the second amount is higher when compared to the first amount. The base station is configured to feedback the second amount to the apparatus. This allows for a reliable communication as the apparatus may use the requested resources for its own communication and may use the additional resources contained in the second amount for other purposes such as forwarding messages from other apparatuses.

BRIEF DESCRIPTION OF THE DRAWINGS

Embodiments of the present invention will now be described in further detail with reference to the accompanying drawings, in which:

FIG. 4a shows a schematic block diagram representing a decoded signal before transmitting a signal according to an embodiment;

FIG. 4b shows a schematic block diagram presenting details of the decoded signal of FIG. 4a;

FIG. 4c shows a schematic block diagram of an example structure of the decoded signal according to an embodiment, having a field comprising a CRC information and having a further field comprising extra-CRC message bits;

FIG. 5 shows a schematic block diagram of at least a part of a network structure according to an embodiment;

FIG. 7b shows a schematic block diagram of the part of the network architecture according to FIG. 7a in a following second time interval;

DETAILED DESCRIPTION OF THE INVENTION

Figure 1:
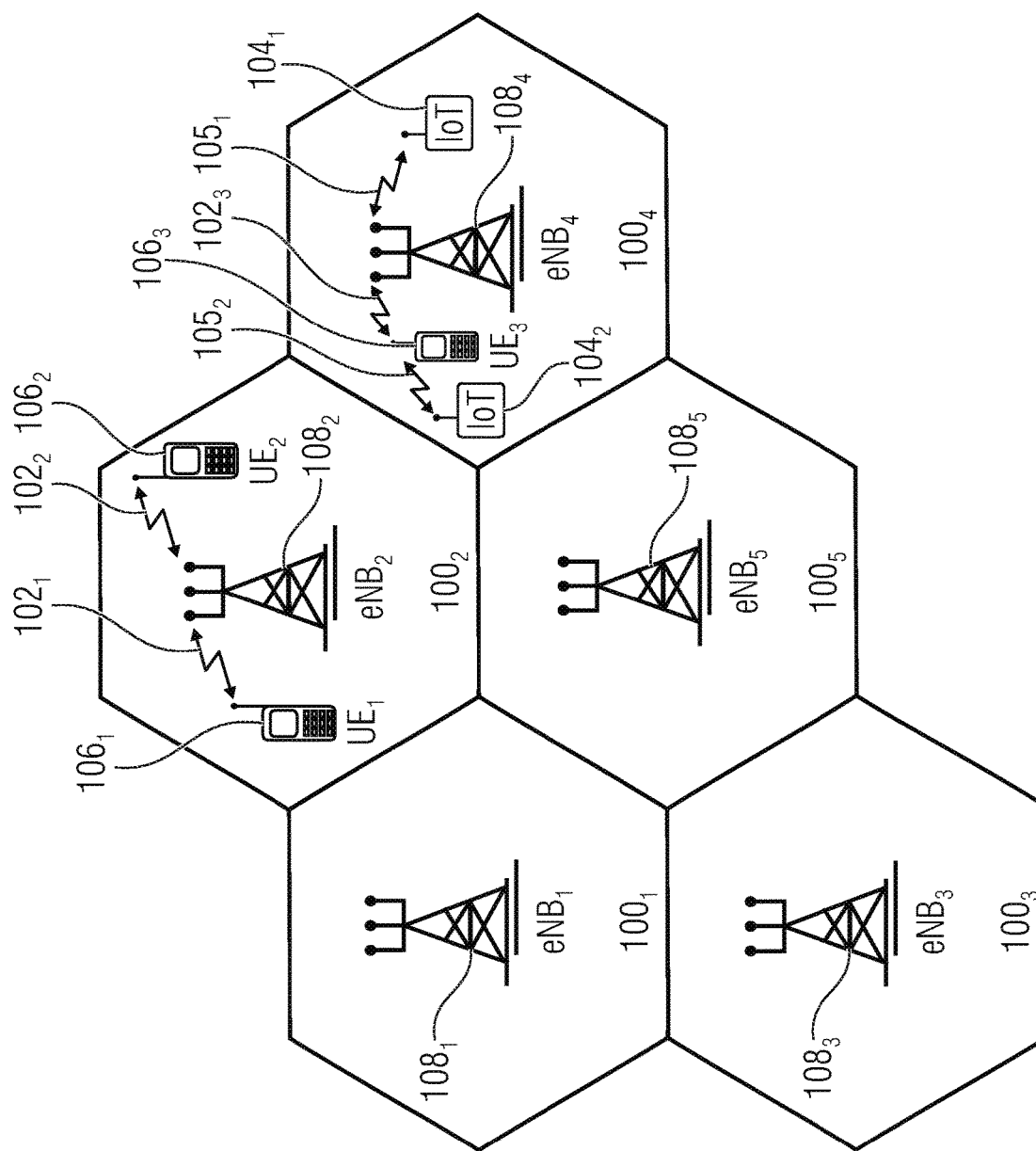
FIG. 1 is a schematic representation of an example of a network infrastructure described in connection with embodiments of the present invention.

Equal or equivalent elements or elements with equal or equivalent functionality are denoted in the following description by equal or equivalent reference numerals even if occurring in different figures.

Descriptions provided herein relating to an apparatus may relate to various kinds of apparatuses. For example, the apparatus may be a user equipment. Such a user equipment may be attached to a further apparatus such as a car, a drone, other flying objects or a different mobile set. Alternatively or in addition, the apparatus may also be a part of such an apparatus and may therefore be itself a mobile set, a car apparatus or any other apparatus configured for performing a device-to-device (D2D) communication, an internet-of-things (IoT) device and a road-side unit. Road-side units may be regarded an apparatus or a base station and may be mounted near to travel parts of devices to be serviced with mobile communication.

In the following description, a plurality of details is set forth to provide a more thorough explanation of embodiments of the present invention. However, it will be apparent to those skilled in the art that those embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Embodiments described herein relate to wireless communications and to the field of using resources in wireless communications network. Although some embodiments described herein are explained in light or a long-term evolution (LTE) standard, the teachings disclosed herein may be used without any limitation in other fields of wireless communications such as 5G, new radio or the like.

FIG. 1 is a schematic representation of an example of a network infrastructure described in connection with embodiments of the present invention. The network infrastructure may be a wireless communications system including a plurality of base stations $108_1$ to $108_5$ also denoted as $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users $106_1$ and $106_2$, also denoted as $UE_1$ and $UE_2$, also referred to as user equipment (UE), that are in cell $100_2$ and that are served by base station $eNB_2$. Another user $106_3$ ($UE_3$) is shown in cell $100_4$ which is served by base station $eNB_4$. The arrows $100_2$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $104_1$ and $104_2$ in cell $100_4$, which may be stationary or mobile devices. The IoT device $104_1$ accesses the wireless communication system via the base station eNB4 to receive and transmit data as schematically represented by arrow $105_1$. The IoT device $104_2$ accesses the wireless communication system via the user $UE_3$ as is schematically represented by arrow $105_2$. $UE_1$, $UE_2$ and $UE_3$ may access the wireless communications system or network by communicating with the base station.

As will be described later in more detail, each other the UEs $106_1$ to $106_3$ may be an apparatus according to embodiments. Alternatively or in addition, also the IoT devices $104_1$ and $104_2$ may be an apparatus according to embodiments described herein. Each of the apparatuses may be a stationary apparatus but may also be a mobile apparatus.

The wireless communications network system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-SOFDM. Other waveforms, like non-orthogonal waveforms for multiple access, e.g. filterbank multicarrier (FBMC), may be used. Other multiplexing schemes like time-division multiplexing (time-division duplex—TDD) may be used.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 sub-frames of 1 ms length, and each subframe includes two slots of 6 or 7 OFDM symbols depending on the cyclic prefix (CP) length.

Figure 2:
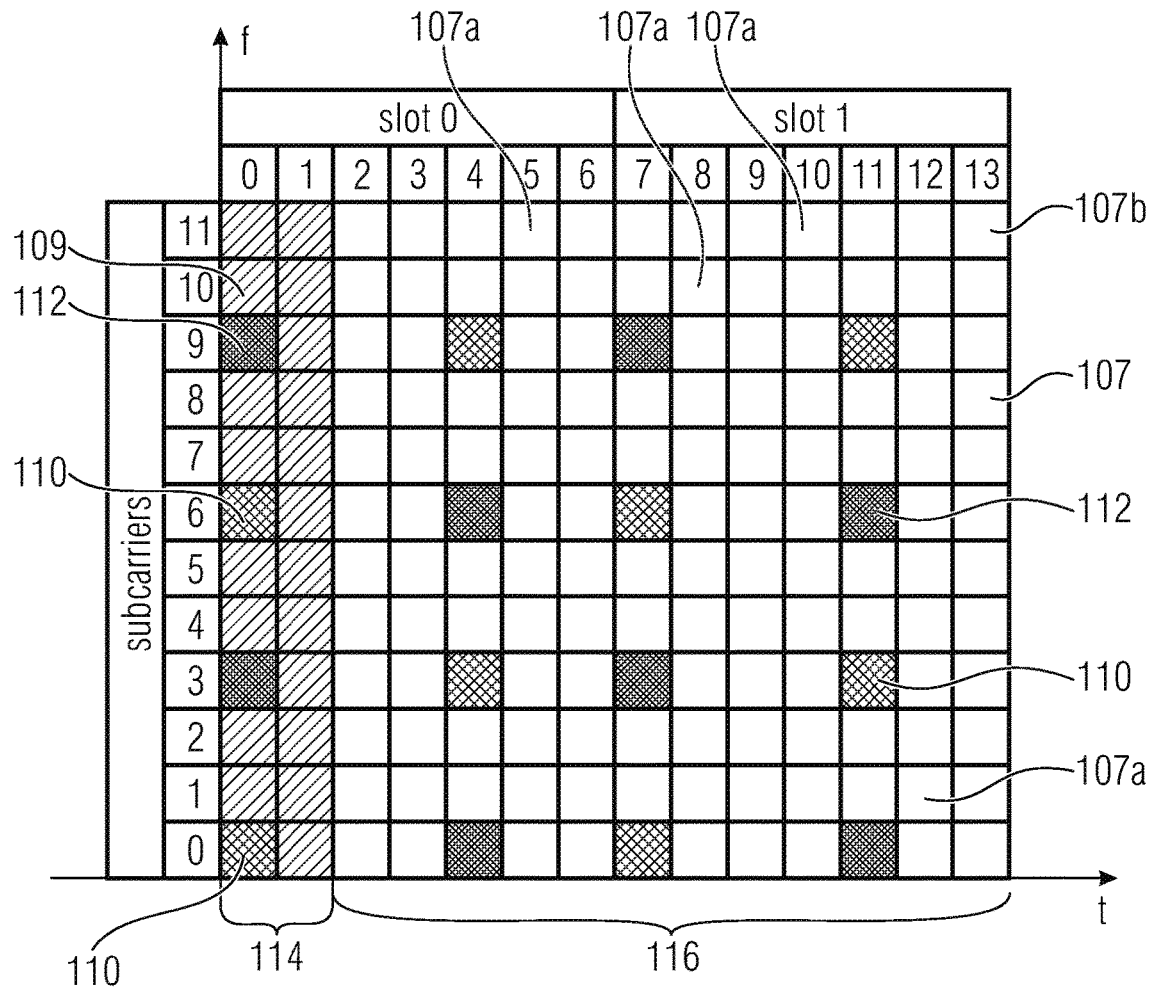
FIG. 2 shows an exemplary LTE OFDMA-based sub-frame with two antenna ports for different selected Tx antenna ports.

FIG. 2 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 107 represent resource elements allocated to the PDSCH including the payload or user data, also referred to a payload region. The resource elements for the physical control channels (including non-payload or non-user data), also referred to the control region, are represented by the hatched boxes 103. In accordance with examples, resource elements 103 may be allocated to the PDCCH, to the physical control format indicator channel (PCFICH), and to the physical hybrid ARQ indicator channel (PHICH). The cross-hatched boxes 107 represent resource elements which are allocated to the RS that may be used for the channel estimation. The black boxes 109 represent unused resources in the current antenna port that may correspond to RSs in another antenna port. The resource elements 103, 107, 109 allocated to the physical control channels and to the physical reference signals are not evenly distributed overtime. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may include symbols associated with payload data or user data and in the slot 0 for symbols 2, 3, 5 and 6, all resource elements 107 may be allocated to payload data, while less resource elements 107 are allocated to payload data in symbol 4 of slot 0, and no resource element is allocated to payload data in symbols 0 and 1. In slot 1, the resource elements associated with symbols 8, 9, 10, 12 and 13 are all allocated to payload data, while for symbols 7 and 11 less resource elements are allocated to payload data.

Each of the resource elements 107 may be allocated to a specific apparatus for communication. The apparatus may use the allocated resource element for its communication. Alternatively, the coordinators as a base station may also define a pool of resource element 107 and may allow a use of those resource elements within the pool for special purposes. The base station may allow the use of the pool of resources via a ground-free axis or via a ground-based axis. The pool of resources may be allocated to one or more apparatuses such that the one or more apparatuses may commonly use the pool of resources. The base station may define none of such pools but may also define one or more pools. By non-limiting examples, the base station may define a first pool having resource elements 107a and a second pool having a different number of resource elements 107b, both belonging to the resource elements 107. The pools may have a same or different size with respect to the amount of resources and may be adapted over time. In connection with embodiments described herein, the pool 107a or 107b may be allocated to one or more apparatuses so as to be used for forwarding messages. I.e., when an apparatus receives a signal to be forwarded, then it may use the additional resources indicated in the respective pool 107a or 107b.

Figure 3:
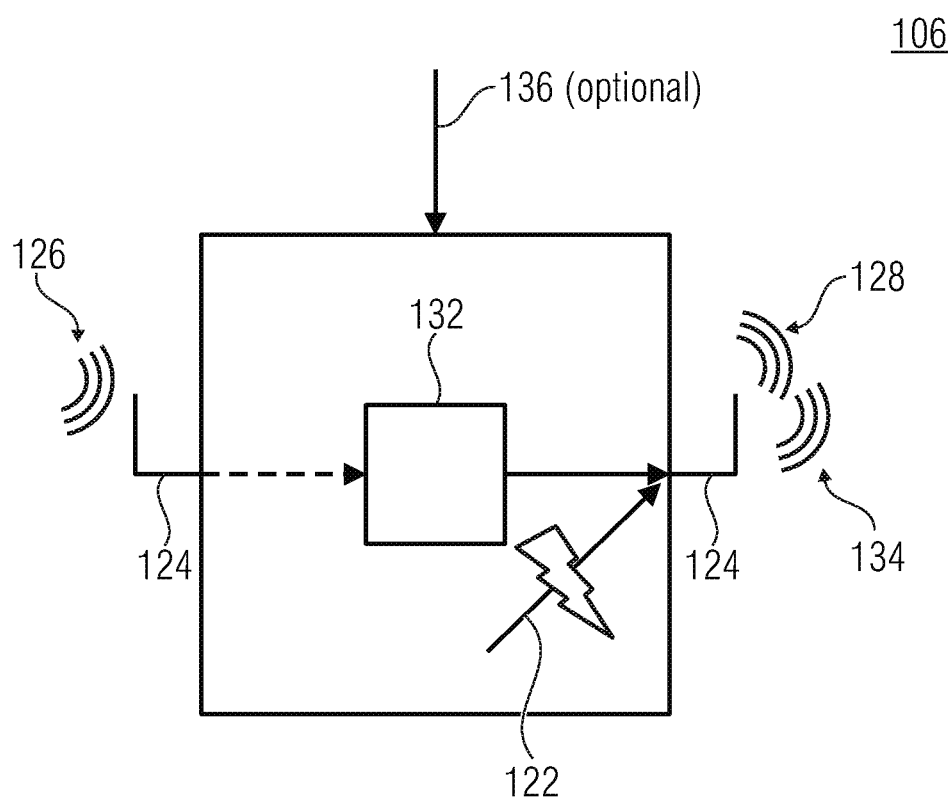
FIG. 3 shows a schematic block diagram of the apparatus 106 according to an embodiment.

FIG. 3 shows a schematic block diagram of the apparatus 106 according to an embodiment. Also referring to the apparatus 106, the description given herein may also relate to the apparatus 104.

The apparatus 106 may be configured to operate in a wireless communication network such as the network illustrated in FIG. 1. The apparatus 106 is configured for generating and transmitting a wireless signal using a resource element allocated to the apparatus, for example, one of the resource elements 107 described in connection with FIG. 2. For transmitting the wireless signal, the apparatus 106 may be configured for applying an information signal 122 to an antenna arrangement 124 being configured for transmitting wireless signals. The apparatus 106 is configured to receive a wireless signal 126 and to determine that the second wireless signal is to be forwarded within the wireless communication network. The apparatus 106 is configured to transmit a wireless signal 128 which is based on the wireless signal 126 instead of the information signal 122 using the allocated resource element of the wireless communication network. I.e., the apparatus 106 may be configured for skipping, interrupting or delaying the transmission of a wireless signal being based on the information signal 122 but may advantageously transmit the wireless signal 128 being based on the received wireless signal 126. This may be understood as the wireless signal 126 having a higher priority when compared to the information signal 122.

For determining that the wireless signal 126 has the higher priority, the apparatus may be configured to evaluate a priority value of the wireless signal 126. The apparatus 106 may be configured to transmit the wireless signal 128 instead of a wireless signal being based on the information signal 122 depending on the priority value being higher than or equal to a priority threshold value. The apparatus 106 may receive information relating to the priority value of the wireless signal 126 by evaluating the wireless signal 126 and/or by receiving a respective information, for example, by receiving a message through a physical sidelink control channel (PSCCH) of the wireless communication, the message containing a critical level field, i.e., a field or section containing a respective information indicating the priority value. Alternatively or in addition, the apparatus 106 may be configured for decoding the wireless signal 126 and for evaluating a critical level field within the decoded signal 126.

Alternatively or in addition, the apparatus 106 may evaluate a sidelink redundancy field within the wireless signal 126. This sidelink redundancy field may either be an additional field when compared to known sidelink redundancy check (CRC) fields and/or an amended version thereof containing information indicating a priority. Alternatively or in addition, the wireless signal 126 may comprise, may be accompanied by or may be associated with a pilot signal having a pilot pattern, for example, pilot symbols being transmitted as part of the wireless signal 126. The apparatus 106 may be configured for evaluating the pilot pattern and for determining the priority value based on the pilot pattern. To be more specific, when the apparatus 106 is configured for evaluating a sidelink redundancy information, the apparatus 106 may be configured for evaluating a relationship between a content of a sidelink redundancy message associated with the second wireless signal 126, e.g., a part or field thereof, and a data content of the second wireless signal and/or by evaluating bits attached to the sidelink redundancy message.

In other words, when compared to known CRC messages, a fixed modification to those CRC messages may be contained in the wireless signal 126 or extra CRC message bits may be contained therein. This may entail full decoding of the received message codeword by the apparatus 106.

According to an embodiment in which the apparatus is configured to evaluate the pilot pattern of a pilot signal associated with the wireless signal 126, the apparatus 106 may be configured to associate a first pilot pattern with a signal that comprises the priority value being higher than or equal to the priority threshold and to associate a second pilot pattern with a signal that comprises the priority value being lower than the priority threshold. According to one embodiment, this may be a binary decision, i.e., the wireless signal 126 may be identified as having at least the priority threshold value when having a predetermined pilot pattern and has remaining unprioritized, if the pilot pattern is different therefrom. Alternatively, different pilot patterns may be associated with different priority values which may be sorted or ranked against each other allowing for deciding which message has to be forwarded amongst a plurality of wireless signals 126 and/or to decide an order or sequence of messages to be forwarded, e.g., according to a sorted priority list.

For example, pilot patterns to be categorized differently may vary complimentarily with respect to each other. For example, the pilot patterns may be represented by a complex valued representation. Those complex valued representations may vary complimentarily with respect to each other, for example, a critical pilot pattern to be prioritized according the $A=1+j, 1-j, -1+j, -1-j, \ldots$ and a non-critical pilot pattern has a conjugate of A and according to $1-j, 1+j, -1-j, -1+j, \ldots$. Thereby, the pilot pattern may be able to indicate critical messages. This can be done by inserting certain pilot patterns (complex IQ values) that indicate certain patterns. Other patterns as the ones described may be used without any limitation. The apparatus 106 may comprise a processor 132, for example, a microcontroller, a field programmable gateway (FPGA), a central processing unit or the like, which is configured for generating the wireless signal 128 based on the wireless signal 126. In view of the data content of the wireless signal 128 and the wireless signal 126, both wireless signals may coincide with each other. For example, the processor 132 may simply retransmit the wireless signal 126. According to an embodiment, the processor 132 may decode and modify the wireless signal 126 before generating the wireless signal 128. An example for a modification may be that the relaying apparatus, i.e., the relaying vehicle or device, changes the signalling to indicate the retransmission event, i.e., to incorporate the respective information into the wireless signal 128 that the wireless signal 126 is retransmitted, to decrement a time to live (TTL) counter of the wireless signal 126 and/or a priority level indicated in the wireless signal 126, which may be reduced, the more often the signal is retransmitted. For modifying the wireless signal 126, a decoding of the wireless signal may be performed by the processor 132.

A decoding of the wireless signal 126 allows, alternatively or in addition, to decide that the wireless signal 126 is discarded instead of forwarded although a forwarding is requested. The apparatus 106 may be configured to discard the wireless signal 126 from forwarding by evaluating the TTL counter/indicator of the wireless signal 126. In a case where the processor 132 determines that the TTL counter is 0 or is reduced to 0, the processor 132 may discard the wireless signal 126. Alternatively or in addition, the processor 132 may evaluate a priority value of the wireless signal 126. If the priority value is lower than a predetermined threshold value or is reduced below the predetermined threshold value, the processor 132 may decide to discard the wireless signal 126. Alternatively or in addition, the processor 132 may evaluate the decoded wireless signal 126, for example, by performing a bit arrow detection, a bit arrow correction and/or plausibility checks. In a case where the processor 132 determines that the wireless signal 126 was decoded incorrectly and may therefore not be retransmitted correctly, the processor 132 may decide to discard the wireless signal 126 from being forwarded. In other words, the relaying vehicle or device may decide to stop relaying a critical message, e.g., if 1. The message TTL counter is decremented to 0;
2. If the priority is lower than the priority of the relaying vehicle's own messages.
3. If the message is decoded incorrectly or alternatively, if messages are received with a lower sensibility than an accepted sensibility.

In other words, the wireless signal 128 may be the wireless signal 126 or a modified version thereof. Although embodiments described herein are already described in connection with cancelling a transmission of a wireless signal being based on the information signal 122, the embodiments described herein are not limited hereto. The apparatus 106 may be configured for transmitting a wireless signal 134 being based on the information signal 122. Instead of using the originally allocated resource element, the apparatus 106 may use a different resource element, i.e., a different code, a different time, a different frequency band and/or a different space resource for transmitting the wireless signal 134. I.e., the allocated resource element may be one of a time slots, a frequency range, a code and/or a space into which the wireless signal is transmitted. According to an embodiment, the apparatus 106 is configured to transmit the wireless signal 128 using the resource element which has been allocated for transmitting the wireless signal 134. The apparatus 106 may be configured for scheduling a transmission of the wireless signal 134 for a subsequent resource element allocated to the apparatus 106, wherein this subsequent resource element may already be allocated to the apparatus or may be allocated in the future.

The described functionality of performing a forwarding of external signals whilst privileging them when compared to own signals may be an operating mode of the apparatus 106 being implemented permanently but may also be an operating mode which is triggered or controlled by a base station transmitting a control signal 136 to the apparatus 106. The control signal 136 may be a broadcast signal or may be transmitted to the apparatus 126 individually, allowing to control all apparatuses within the wireless network or wireless network commonly or, alternatively, the apparatus 126 individually. The base station transmitting the control signal 136 may thereby control the apparatus 106 so as to time-selectively operate in a first operation mode in which the apparatus is configured to forward the wireless signal 126 instead of the own wireless signal 134 using the allocated resource element of the wireless communication network, and a second operation mode in which the apparatus 106 is configured to transmit the own wireless signal 134 using the allocated resource element, i.e., to not privilege the wireless signal 126.

For receiving the wireless signal 126 and for transmitting the wireless signals 128 and/or 134, the apparatus 106 may comprise separate antenna arrangement 124 but may also use a combined or single antenna arrangement, wherein each antenna arrangement may comprise one or more antenna elements.

FIG. 4a shows a schematic block diagram representing a decoded signal 138, which may be obtained, for example, when decoding the wireless signal 126 and/or before transmitting a signal as a wireless signal such as the wireless signal 128. The decoded signal 138 may comprise a plurality of fields 142, wherein each field may comprise one or more information portions. For example, one of the fields 142 may comprise an information indicating a priority of the signal. Another field 142 may comprise a CRC information. Another field 142 may comprise a pilot information or a pilot pattern. The apparatus 106 may be configured for evaluating information contained in other fields 142 for deciding or determining actions to be performed.

Figure 4B:
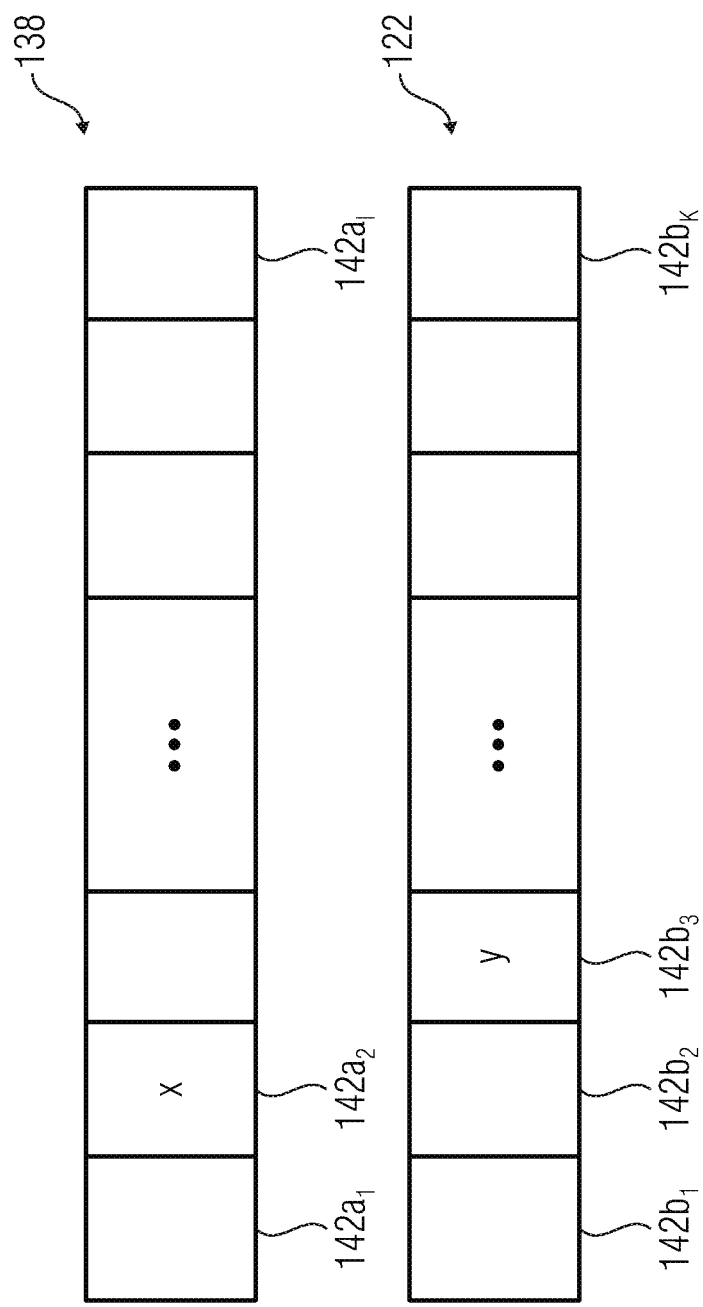

FIG. 4b shows a schematic block diagram of the decoded signal 138 which is, for example, the decoded version of the wireless signal 126. FIG. 4b further shows a schematic block diagram of an example structure of the information signal 122 which also comprises fields 142 being indicated as 142b, i.e., their content and/or structure may differ when compared to the fields 142a of the decoded signal 138. Further, a number of fields I of the decoded signal 138 may vary when compared to a number K of fields of the information signal 122, wherein alternatively also a same number of fields may be present. By way of example, the fields $142a_2$ and $142b_3$ may contain a priority information x, y, respectively. The apparatus 106 may be configured for comparing the priority information and for determining, which of the priorities has a higher priority class and may transmit the wireless signal with the higher priority class first. The apparatus 106 may be configured to receive a priority list indicating a priority threshold value indicating when to privileging a signal to be forwarded against an own signal. I.e., the apparatus 106 may receive information indicating which priority is high enough for privileging. Privileging may be based on a comparison against an own priority but is not required to. I.e., the information signal 122 may also be present without a priority information. The priority list indicating a priority threshold value indicating when to privileging a signal to be forwarded against an own signal may be transmitted by a base station according to an embodiment to the apparatus 106.

FIG. 4c shows a schematic block diagram of an example structure of the decoded signal 138 in which a field such as the field 142$_2$ comprises a CRC information and in which a further field such as the field 142$_1$ comprises extra-CRC message bits. The fields 142$_2$ and/or 142$_1$ may be any fields within the decoded signal 138 and may form a combined field. The description provided in connection with the apparatus 106 may be referred to as a communication, probably between vehicles, i.e., vehicle-to-vehicle—V2V—and a V2V relaying for better reliability and transmission coverage of critical messages transmission between critically communication paths/partners.

In the content of V2X, i.e., vehicle-to-anything, it may be an object to achieve 2 ms maximum delay and reliability of at least 99.999%. This is very difficult for fast-moving cars and proximity service in harsh, dynamically changing environment. Even though two vehicles might be in urgent need to deliver a critical nature message about the road situation, critical information about expected accidents, critical position information for autonomous driving, fatal pedestrian sudden changes, etc. Hence, it may be mandatory to build communication that may achieve a shortened transmission time interval (time-slot) that may go to times of less than ⅒ ms in legacy wireless standards and even much less for new radio numerologies. Embodiments provide for natural concepts that allow transmission of critical messages from one vehicle to another vehicle, from the base station (BS)/a roadside unit (RSU) to a vehicle and/or vice versa. Hence, once the critical message arrives to a vehicle defined as a relay-UE (e.g., by BS or RSU through configuration signalling, i.e., control signal or also referred to as SI2), it may append/concatenate/insert in the signalling field/PSCCH (physical-sidelink control channel) to the proper signalling for critical message identification and transmit on the earliest transmission (TX) opportunity possible. The relay-UE will know the criticality of the message after decoding the signalling field and/or the reference pilot patterns and/or any other critical indication mechanism.

Hence, in this case, e.g., a vehicle or multiple vehicles will transmit a single or a plurality of critical messages to other vehicles or RSU or BS or to all of them if they are reachable. This does not preclude a different representation of TX/RX (reception) bands and technologies. In such a scenario, the intended vehicle(s) or RSU are not transmitting on the same instant, they will not miss the critical transmitted frame(s). If the intended vehicle(s) or RSU are also transmitting on the same instant, other relays may transmit on other transmission instants to consolidate the same behaviour of the first relay(s) which failed to consolidate message transmission to the intended user/RSUs.

As a solution to the proposed scenario where other devices or vehicles monitoring this transmission events on their receivers can simply identify the critical messages from signalling (entails decoding) or early detect the messages from the content, e.g., reference symbols (RS) pattern or structure as described herein.

Once the message is recorded at the receiving devices or vehicles, they are able to prioritize this critical transmission over their own transmission. Another option is that every device is also receiving some over-provisioned resources, i.e., not all the resources allocated to the device are consumed by the device to cover its own transmission. Such embodiments are described by further embodiments of the present invention but may also be combined with embodiments relating to prioritizing the messages.

In the case of over-provisioning resources, every device or vehicle intended to relay the critical message has to wait until a complete time-slot is received. The earliest possible transmission instant may be the next time-slot (the earliest time-slot after receiving the critical message). If decoding is not important and the message was detected early, e.g., by utilizing the RS pattern, discrete, possibly regenerated, quadrature (IQ) samples may be relayed to the air. If decoding is supported, only correctly receiving devices or vehicles are able to relay the message. The fastest event will be after another time-slot. However, if the time-slots are much shorter than the 1 ms, a minimum end-2-end delay is in the order of 1-2 ms consolidate is still possible with multiple spontaneous relaying.

FIG. 5 shows a schematic block diagram of at least a part of a network structure comprising the base station 108 and an apparatus 144 according to an embodiment, wherein the apparatus 144 may also be the apparatus 106. Thereby, the explanation given in connection with the apparatus 144 may also be combined with the explanation given in connection with the apparatus 106 and/or 104. The apparatus 144 may be a vehicle capable of communicating within a wireless communication network and/or a user equipment connected to a vehicle. Alternatively, any other configuration of communicating devices may be implemented.

The apparatus 144 may be configured for transmitting a request signal 146 to the base station 108 indicating an amount a of requested resources, i.e., indicating resource elements that are used for own communication. The apparatus 144 is configured for receiving a feedback 148, i.e., an allocation signal, from the base station 108. The feedback may indicate an amount c of resource elements that are actually allocated to the apparatus 144. The amount c may differ from the requested amount in that the allocated amount c is higher when compared to the requested amount a. I.e., the apparatus 144 is allocated with the requested amount a and with an additional amount b, wherein a+b=c. Thus, the base station 108 is configured to allocate, to the apparatus 144, the amount c of resource elements, and is configured to feedback the second amount c to the apparatus 144.

The base station 108 may use a downlink control channel of the wireless communication network cell between the base station and the apparatus 144 or a sidelink control channel of the wireless communication network cell between apparatuses within the wireless communication network cell for signalling the second amount c to the apparatus 144. I.e., the base station may be able to transmit and receive in sidelink domains, e.g., using the sidelink control channel.

After having received the feedback 148, the apparatus 144 has knowledge that it has additional resources available for further purposes. An example for such a further purpose is a forwarding of messages, i.e., high-priority messages as described in connection with the apparatus 106. I.e., when receiving the wireless signal 126 being described in connection with FIG. 3, the apparatus 106 may either use one of the additional resources contained in the additional amount b or one of the initially requested and allocated resource elements in the amount a. for example, the apparatus 106 or 144 may use the earliest available resource element within the amount c. This may lead to a re-scheduling of the transmission of the information signal 122, the wireless signal 134, respectively, from the initially scheduled resource element to a following resource element which may be a part of the additional amount b. I.e., the apparatus 144 may be configured to negotiate with the base station 108 an amount of resource elements a to be allocated to the apparatus 144 for data communication. The apparatus may be configured to disregard during the negotiation an additional amount of resource elements finally allocated to the apparatus, a, it may negotiate the amount a without knowledge or without considering the amount b. After the negotiation, the finally allocated amount of resource elements c may exceed the requested amount a of resource elements.

As described in connection with FIG. 2, the additional resources b may be a pool of resources, for example, comprising the resource elements 107*a* or 107*b* and/or a combination thereof. The pool of resources may be available for a plurality of apparatuses being adapted or controlled so as to forward wireless signals. Within the available resource elements of the amounts b or c, the apparatus 144 may select a resource element for forwarding wireless signals comprising a minimum time delay with respect to a time of reception of the wireless signal to be forwarded. The pool of additional resources may be ground-free or may be grounded by the base station 108 operating a cell of the wireless communication network in which the apparatus is operated.

The apparatus 144 may monitor one or more parameters in connection with forwarding of a wireless signals. Such a parameter may be, for example, information indicating a number and/or a frequency of an occurrence of retransmission events, i.e., a reception of wireless signals 126, information indicating retransmission event locations, i.e., locations indicating a transmitter of the wireless signal 126 or the reception of such a signal, information indicating a retransmission rate, information indicating retransmitted packet lengths, information indicating a received time-to-live information of the wireless signal 126 and/or information indicating a criticality level of a quality of service indicated within the wireless signal 126.

Figure 6:
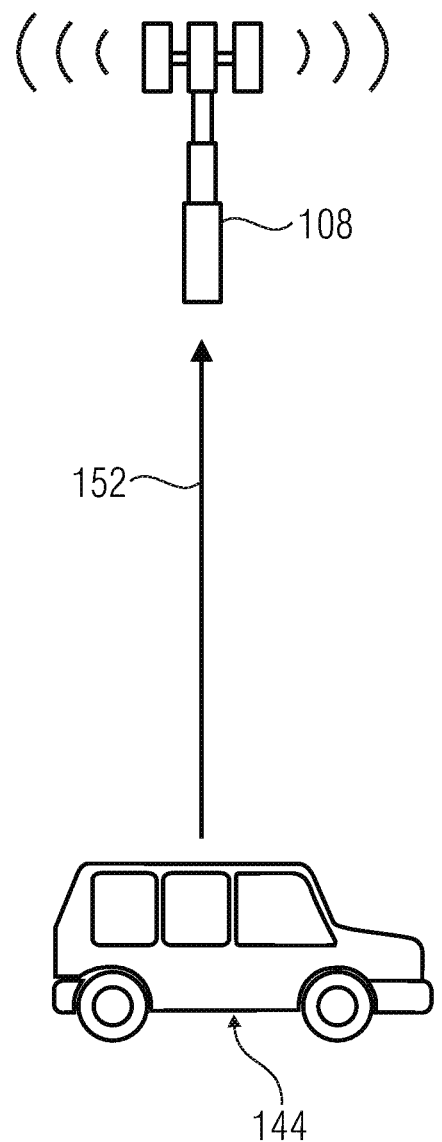
FIG. 6 shows a schematic block diagram of a base station and an apparatus according to an embodiment.

FIG. 6 shows a schematic block diagram of the base station 106 and the apparatus 144. The apparatus 144 may be configured for transmitting a reporting signal 152 to the base station 108. The reporting signal 152 may comprise information monitored by the apparatus 144 in connection with the above-indicated information. I.e., the apparatus 144 may provide the monitored information to the base station 108. Alternatively or in addition, the apparatus 144 may be configured for providing the monitor information to a centralized controller. This may allow the base station and/or the centralized controller to determine parameters that allow adapting the network controlling in further time intervals, for example, in view of the allocation of additional resources, i.e., the amount b. Such determined information may be, for example, a maximum utilization of the allocated resources or an allocated resource pool, a location or a plurality of locations at which a high amount of retransmissions occur and/or retransmission time events and/or a criticality level over an area within the wireless communication network. Alternatively or in addition, the apparatus 144 may determine such parameters on its own in connection with the monitored information. The apparatus 144 may report such determined parameters to the base station 108.

The determined results may be used by the base station 108 such that the base station 108 is not only configured to negotiate, with the apparatus 144, the first amount a dependent on a resource requirement of the apparatus, including to administrate the first amount a for transmissions of the apparatus 144, but also to allocate, to the apparatus 144, the additional resource elements b for the purpose of forwarding messages in the networks. The base station 108 may determine the second amount b. The base station may be configured to adapt the amount b of the additional resource elements dependent on an amount of forwarding messages in the network. I.e., in a case where the amount of messages to be forwarded increases, the amount b may be increased by the base station 108. On the contrary, when the amount of messages to be forwarded decreases, then the amount b may be decreased by the base station 108.

The base station 108 and/or the centralized controller may be configured for receiving the wireless signal 152 comprising information indicating that the second amount b and/or a portion thereof is used for forwarding a plurality of wireless signals. In addition, the monitored and/or determined parameters may be transmitted. The base station may receive such information from one or more apparatuses and may be configured to determine at least one of a maximum utilization of allocated resources or an allocated resource pool, one or more highly retransmission locations and/or retransmission time events, a criticality level over an area within the wireless communication network, a suitable resource overprovisioning around the clock and/or for different zonal accesses, a need to activate or deactivate retransmission and/or critical zone to update vehicles speed around the clock. The base station and/or the centralized controller may perform a learning or deep-learning which may also be referred to as a machine learning, stochastic learning or the like. Thereby, the base station and/or the centralized controller may be configured to perform an evaluation of the received information in the reporting signal 152 and to perform at least one of the deep-learnings, a machine learning or a stochastic learning using a result of the evaluation performed by the apparatus 144 or the base station 108 so as to adapt the second amount b.

In other words, a concept of retransmission deep-learning may relate to a concept according to which some, most or all of the vehicles/network nodes may keep a history of observed distribution of standard retransmissions or retransmissions of critical messages in order to learn with context about certain situations/trends occurring. According to embodiments, some, most or all of the UEs that perform retransmission are able to get statistics of the retransmission history which may include retransmission events, including time stamp and pointer to the daily events, such as night, morning, rush hour or the like, retransmission event locations, e.g., for road analysis, a retransmission rate, a retransmitted packet length, retransmitted TTL and/or criticality level and quality of service (QoS) information. The network nodes, in particular RSUs and BS(s) if they are not involved in transmitting to any device during the dedicated resource pool sub-frames/time-slot, may be adapted to monitor all critical messages requesting transmission or coming over-the-air due to a retransmission and to keep said information. The network node may be configured for collecting and/or monitoring the same information as collected by the UE and/or even more due to a collection of information from different UE. When regarding the UE, once the UE has all the proposed information, it can perform a deep analysis, i.e., a deep learning (using greedy algorithms or machine-learning), to analyse the situation over the road. Information can be used to support sufficiently utilized resource allocation, i.e., for identifying a maximum utilization of a resource pool (based on the retransmission sizes, etc.)

identifying highly retransmission location and time events criticality level over the road Regarding the network nodes, the nodes can analyse the collected information for the traffic situation analysis according to the road positions and day-time events. Also greedy algorithms or machine-learning mechanism may be used to identify:

the suitable resource overprovisioning around the clock and for different zonal access identifying the need to activate or deactivate retransmission, e.g., to reduce interference in rush hour where cars are slowly moving identifying the critical zones to update vehicles 'speed around the clock Alternatively or in addition to the deep-learning of the message forwarding, the message forwarding may be used for another advantageous functionality which may allow for upgrading the half-duplex communication of UEs to an almost full-duplex communication. This may allow for obtaining a virtual full-duplex communication between critically communicating paths and/or partners.

Figure 7A:
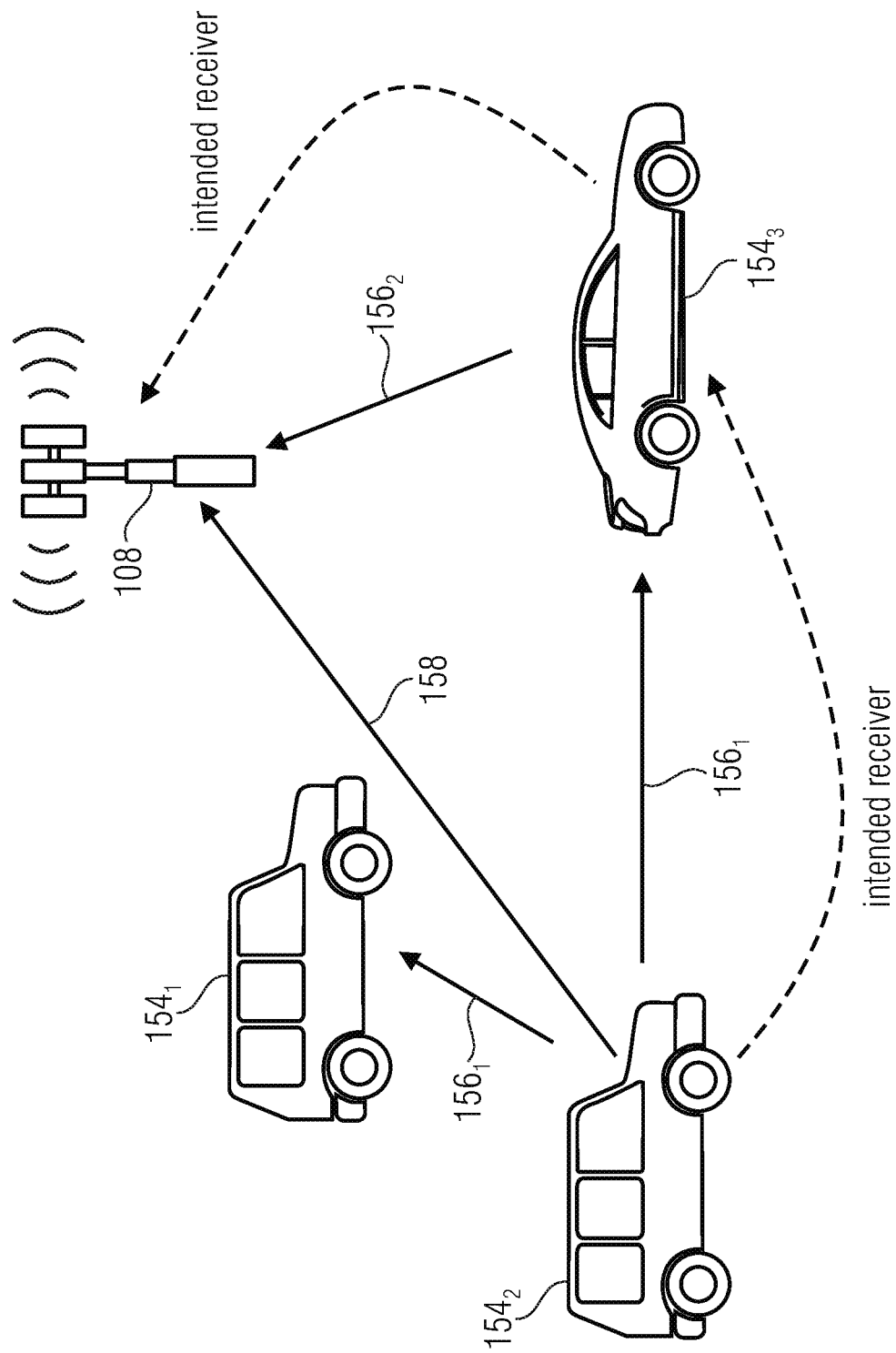
FIG. 7a shows a schematic block diagram of at least a part of a network architecture in which three apparatuses are served by the base station according to an embodiment in a first time interval.

FIG. 7a shows a schematic block diagram of at least a part of a network architecture in which three apparatuses $154_1$, $154_2$ and $154_3$ are served by the base station 108. The apparatuses $154_1$ to $154_3$ may be configured as described in connection with the apparatuses 104, 106 and/or 144. The apparatuses $154_2$ and $154_3$ may be configured for transmitting a wireless signal $156_1$, $156_2$, respectively, wherein the apparatuses $154_2$ and $154_3$ may use same or different resource elements. The intended receiver of the apparatus $154_3$ may also be the apparatus $154_2$ such that both apparatuses $154_2$ and $154_3$ are trying to transmit messages to each other.

The wireless signal $156_1$ is also received by the apparatus $154_1$. Additionally, the apparatus $154_2$ may transmit an indicator signal 158 to the base station 108, for example, using a sidelink channel of the wireless communication network, such that the indicator signal 158 may also be referred to as a sidelink signal. The indicator signal 158 may indicate a request that the signal $156_1$ transmitted by the apparatus 154 should be forwarded by nodes that are not the intended receiver of the wireless signal $156_1$. Because of its own transmission, the apparatus $154_3$ may be unable to receive and/or decode the wireless signal $156_1$. Responsive to the indicator signal 158, the base station 108 may instruct other apparatuses such as the apparatus $154_1$ to retransmit messages. Alternatively or in addition, the indicator signal 158 may also be received by the respective apparatus, e.g., the apparatus $154_1$ which is instructed, responsive to the indicator signal 158 for retransmission.

FIG. 7b shows a schematic block diagram of the part of the network architecture according to FIG. 7a in a following time interval. The apparatus $154_1$ is configured to retransmit the received wireless signal $156_1$ as a retransmitted signal 162, e.g., the wireless signal 128. I.e., the apparatus $154_3$ is configured to transmit the signal $156_2$ using a first resource element and to receive, using a second resource element, the wireless signal 162 being based on the wireless signal $156_1$ that was sent by the apparatus $154_2$ even if both apparatus $154_2$ and $154_3$ have used a same resource element for transmission of the signals $156_1$ and $156_2$. Thereby, a virtual full-duplex communication may be enabled. The retransmission appears sequentially to resolve the probability that two users intending to talk to each other and they transmission appears in the same time-slot. The apparatus $154_1$ may be configured to receive the wireless signal $156_1$ and to determine that this signal is to be forwarded within the wireless network. The apparatus $154_1$ may be configured to transmit the wireless signal 162 based on the wireless signal $156_1$ instead of an own signal using the allocated resource element, as described in connection with the apparatus 106.

I.e., in the network illustrate in FIG. 7a and FIG. 7b, the apparatus $154_1$ may act as the apparatus 106. The apparatus $154_2$ and the apparatus $154_3$ may each act as a transmitter configured to transmit a message using a resource element which may be the same resource element for both transmitters. The apparatus $154_1$ may be configured to receive the message of the apparatus $154_2$ and to transmit the message as the message 162 using a different resource element. Each of the apparatuses $154_1$ to $154_3$ may signal, to the base station 108, a requested amount of resource elements, as described in connection with FIG. 5. The base station 108 may be configured to assign the second amount c of resource elements to the apparatuses $154_1$, $154_2$ and/or $154_3$ so as to allow a plurality of apparatuses to share common resource elements.

Figure 8:
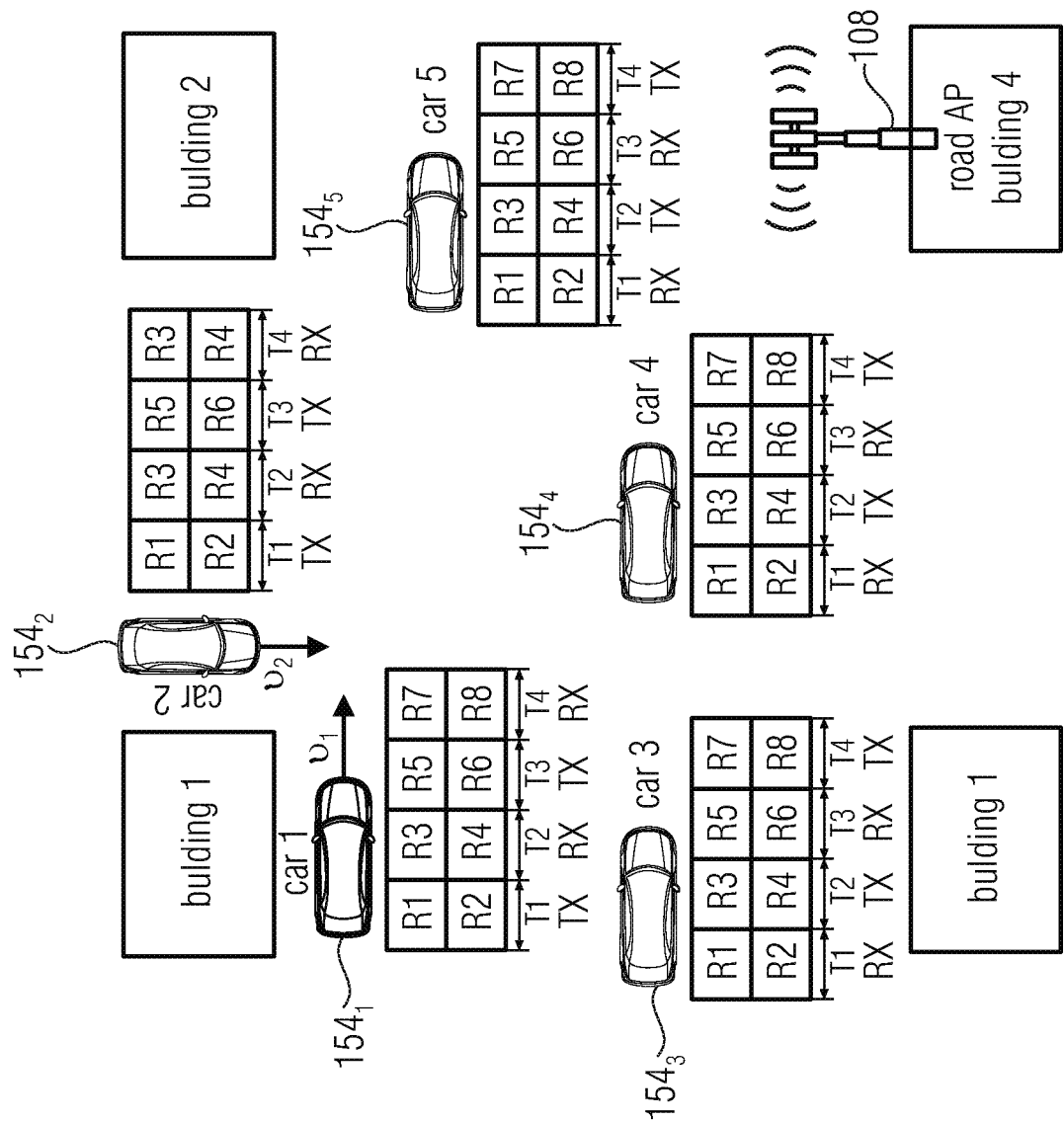
FIG. 8 shows a TX-RX resource pool sharing a critical message transmission/relaying according to an embodiment.

FIG. 8 shows a TX-RX resource pool sharing a critical message transmission/relaying in which R1 is a resource block used for sending message 1 from car 1 and R2 is a resource block used for sending message 2 from car 2 which is received by cars 3, 4 and 5, respectively. In time-slot T2, car 3 transmits using resource block R3 and car 4 transmits using resource block R4. Car 5 transmits in time-slot T4 using resource block R7. Embodiments relating to relaying for enhancing virtual full-duplex operation may be based on an assumption of having two terminals, e.g., in vehicle 1 and vehicle 2, sending two critical messages to each other at exactly the same time-slot. Even though the vehicle 1 transmits on frequency block F1 and vehicle 2 transmits on frequency block F2, the communication between the two vehicles is half-duplex transmission. The reason is that both terminals are dealing with these frequency resources at this slot as their transmission pool, i.e., a TX-pool. In order to resolve this half-duplex problem between simultaneously links, embodiments provide for a relaying mechanism so as to deliver messages to the simultaneously communicating terminals. This may be done repeatedly until both terminals receive the messages. FIGS. 8 and 9 again illustrate the concept. FIG. 8 illustrates the resource pool designed for TX-RX resource pool, critical communication facing the worst case, i.e., for the half-duplex problem arising due to V2X resource allocation, and three different relays which are allocated with overprovisioned resources or prioritizing critical transmission on different events. Further, in FIG. 8, there are also shown two events where vehicles are either monitoring different subframes, i.e., time-slots, as either a transmission pool or a receiver pool. The pools may be distributed by the base station according to their needs and/or their geospatial locations or zones.

Figure 9:
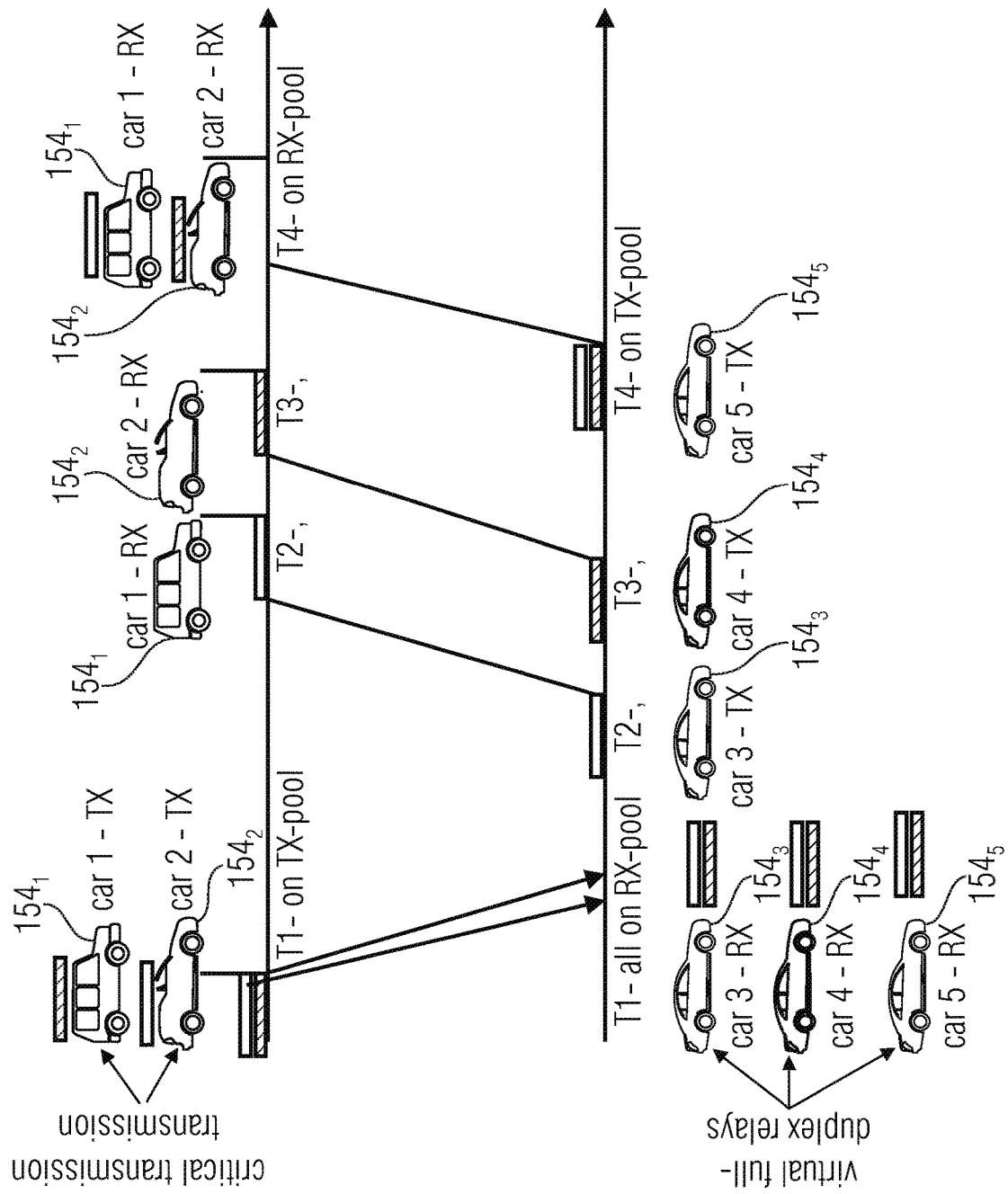
FIG. 9 shows a timeline for the scenario of FIG. 8 according to an embodiment.

FIG. 9 illustrates a timeline for the scenario of FIG. 8. The slots T1 to T4 are not necessarily sequential time-slots/subframes/time-slots. Similar to the previous model, car 1 and car 2 may create a critical communication transmission and they may do this due to a simultaneous transmission in a same time-slot, i.e., creating the worst case unmanaged half-duplex transmission. Cars 3 and 4 may perform relaying transmission over their overprovision resources or prioritizing the critical transmission over their own messages.

In other words, FIG. 9 shows a TX-RX timeline showing the urgent communication (from car 1 and car 2) coexisting in time and how it is reliably retransmitted via relays (cars 3, 4 and 5). Using time-slots T2, T3 and T4, the cars 3, 4 and 5 retransmit the messages received from cars 1 and 2. Therefore, although facing some delay, the messages transmitted by cars 1 and 2, i.e., apparatus $154_1$ and $154_2$ may be delivered to each other using the relays, i.e., apparatus $154_3$, $154_4$ and $154_5$ representing cars 3, 4, 5, respectively.

Figure 10:
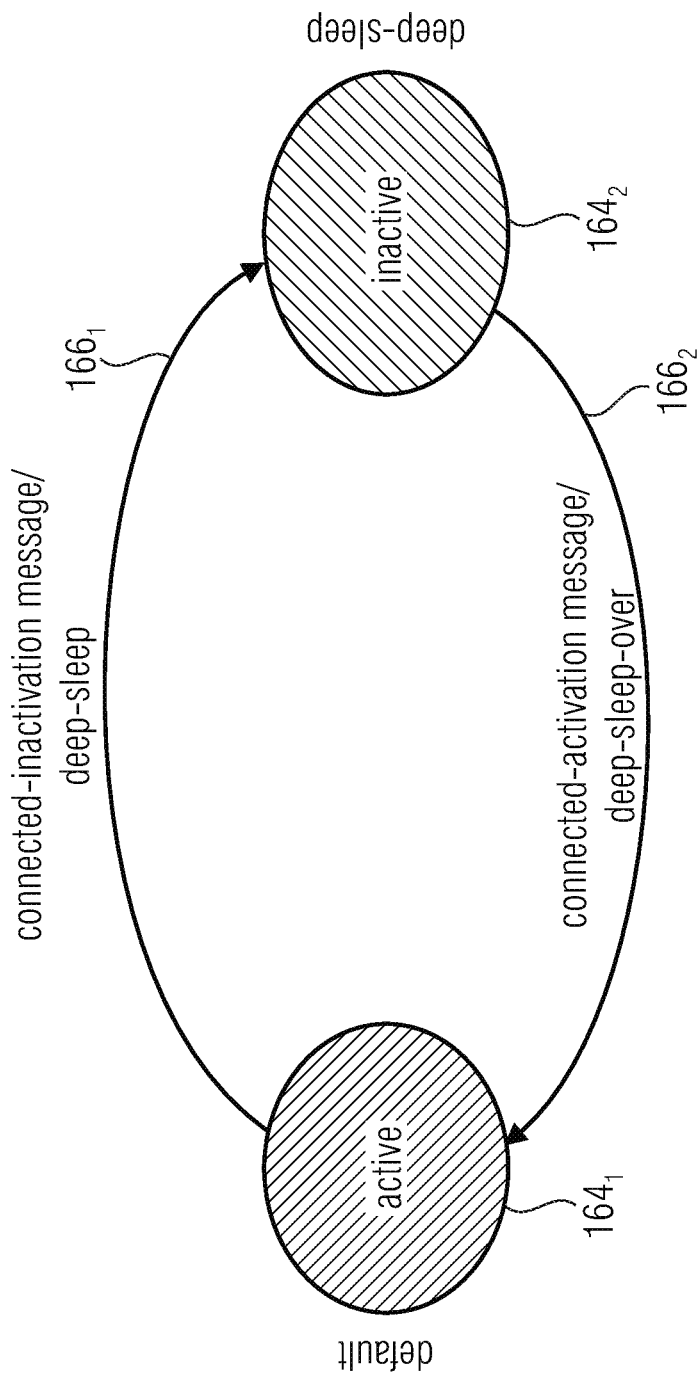
FIG. 10 shows different signalling information messages and a single signal identification concept according to embodiments.
Figure 11:
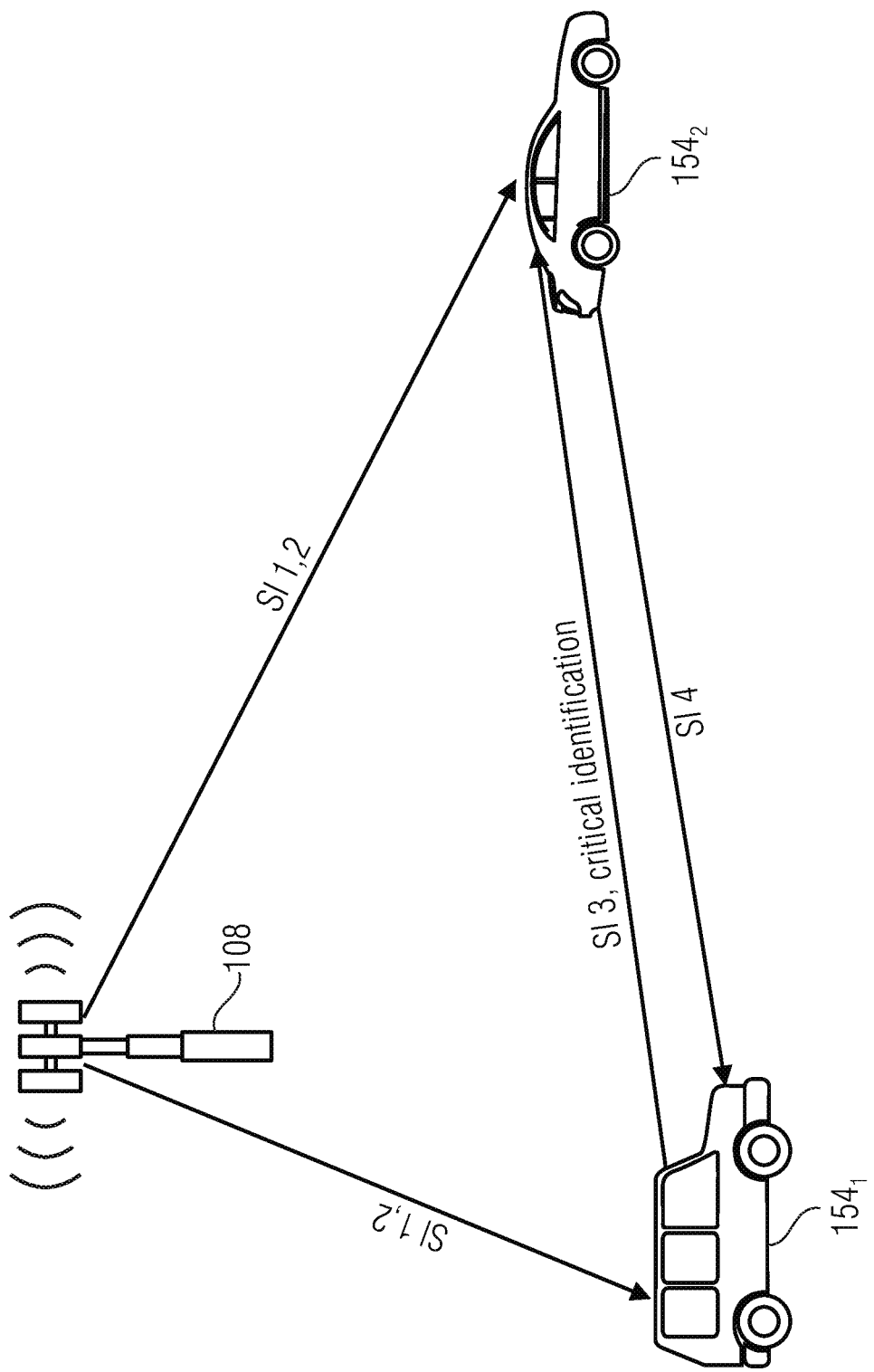
FIG. 11 shows a schematic block diagram illustrating a transmission of signalling information of FIG. 10 according to an embodiment.

For supporting the reliable relaying communication, a signalling may be used that may be based on a concept according to FIGS. 10 and 11.

FIG. 10 shows different signalling information (SI) messages and a single signal identification concept. The used messages may be according to:

1. SI1: base station send to devices/vehicles within the downlink control channel:
   a) the resource pool and dedicated transmission pools for critical communication (if possible), e.g., the transmission pools 107a and 107b;
   b) overprovisioned resources, e.g., as a Boolean variable, e.g., 0 or 1, where 1 may mean that there are more resource blocks than the vehicles may use; and/or
   c) a priority list and/or message priority wait for V2V critical messages
2. SI2: activation/deactivation over-riding message from the network (i.e., from base station and RSU):
   a) initially, all the V2X relay-capable UEs start with a relay-enabled mode as a default mode. Thereafter, once the device is active, the later can still control the relay capability to be staying as active or switching it to inactive, i.e., between state $164_1$ representing an active state and state $164_2$ representing an inactive state, e.g., the device being in a deep-sleep, messages $166_1$, $166_2$ respectively may be transmitted. Using a message $166_1$, which may also be referred to as a connected-inactivation message/deep-sleep message, the relay or apparatus may be controlled from the active mode $164_1$ to the inactive mode $164_2$. Using the message $166_2$ which may also be referred to as connected-activation message/deep-sleep-over message, the relay may be returned from the inactive mode $164_2$ tot eh active mode $164_1$.
   b) in the deep-sleep mode or a power-reservation mode, the UE may deactivate the relaying automatically;
   c) once the V2X switches to an idle mode or network reconnected/in-space connected mode, it may return back to the default status in which the relay is activated, i.e., the state $164_1$;
   d) this message overrides the activation to deactivation once the network wants to override. The overriding message for relaying capability for critical messages (SI2) may target individual devices, groups of devices and/or a global network control. In other words, FIG. 10 shows an activation/deactivation state machine of an apparatus according to embodiments.
3. SI3: the vehicles, which transmit the critical messages, send specific control information carried on the sidelink transmission indicating requirement for ultra-reliability priority/level and/or a maximum delay/TTL. In general, the RSU and/or BS may monitor all RX resources, if they are not transmitting on them for any other UE, i.e., non-sidelink or non-V2X users as well.
4. SI4: the relaying vehicles/devices may change or alter or modify the relayed message signalling, e.g., if the message is decoded at the relay, indicating a retransmission event, the current time to live counter and/or the priority level which may be reduced or decremented the more it is retransmitted.
5. SI5: critical identification: for early indicating messages at the relaying devices, the vehicle that transmits critical messages may embed a pattern form, e.g., in the pilot symbols, identifying that the message is critical. E.g., I/Q samples of the critical messages may be orthogonal on the non-critical messages. This allows for identification of critical messages without decoding them.

As illustrated in FIG. 11, the SI1 and 2 may be transmitted from the base station to other nodes, wherein the SI3, SI4 and the critical identification, i.e. SI5, may be transmitted between apparatuses $154_1$ and $154_2$.

Embodiments present a concept having a method and an apparatus to perform reliable communication with a short delay and ultra-reliable fashion for vehicle-to-vehicle (V2V), device-to-device (D2D) and ultra-reliable communication. According to the concept, a more reliable or even guaranteed communication in terms of a robust communication with a very short delay may be achieved by one or more of:

I—Designing an over-provisioned resource allocation/resource pool that can be utilized to relay critical information II—Designing a proper DL signalling (for vehicle-to-anything (V2X)) to utilize over by instructing less critical users to wave their transmission rights on favour of critically received messages in the proximity region III—Design a proper UL signalling (for V2X) to inform the road-side-units (RSU) or base-stations (BSs) of the current V2V critical transmission activity to for optimized over-provisioning IV—Design a proper critical message signalling on the level of the side-links (device-to-device communication or V2V) to be discovered on these devices and to figure out the necessity of prioritize and relay these messages from devices/vehicles capturing them on the RX resource pool V— Propose a spontaneous relay from devices (or vehicles) in the proximity of the critical communication on earliest possible transmission slot available for these devices on the TX pool and/or dedicated emergency/exceptional/critical pool if possible.

In connection with the retransmission, an appropriate signalling may be used. In order to manage the spontaneous retransmission, multiple signalling levels have to be created. Those are listed below:

1—The BS has to dedicate the resource pool and dedicate dedicated transmission pools for critical communication, over-provisioned resources, or priority list 2—The BS has to activate individual vehicles/devices for being capable relays in the network. BS can deactivate individual devices similarly.

3—The vehicle which transmits the critical message has to embed a critical message signalling which can have the criticality level/priority, used maximum delay, and/or a time-to-live (TTL) counter. This critical signalling can be embedded by the critically transmitting users using either:
   a. Embed a critical level field in the sPSCCH (physical-sidelink control channel), if control information will be fully decoded at the relay-UE. This entails waiting the whole time-slot to decode
   b. Embed a critical level field inside the data codeword, i.e., in the sPSDCH (physical-sidelink shared [Data] channel), if data field will be fully decoded at the relay-UE. This entails waiting the whole time-slot to decode and uses encryption/decryption in upper layers key exchange (or simple key selections from predefined keys used in critical message transmission c. A fixed modification to the CRC message or extra CRC messages bits; this also needs full decoding of the received message codeword.

d. Finally, [part of our innovation] changing the pilot pattern to be able to indicate critical messages. This can be done by inserting certain pilot pattern (complex IQ values) that indicates certain pattern. For example:

i. Critical pilot pattern: A=1+j, 1−j, −1+j, −1−j, . . . .

ii. Non-critical pilot pattern: conjugate of A=1−j, 1+j, −1−j, −1+j, . . . .

The embodiments described herein face for a reliable communication, i.e., the invention proposes a reliable retransmission of critical messages by allowing the devices in the vicinity of the critical message transmission to spontaneously relay the message to all the neighbourhood including the intended receiver.

a. The relays will indicate the necessity for retransmission as early as detecting the physical layer symbols or after decoding the message body. Hence, critical messages can be retransmitted in the next early transmission event from every possible relay device.

b. The relays can detect the criticality of the message very early by using: a—early detection pattern, may be embedded in the reference symbols; b—from the sidelink control information and signalling after fully decoding the message. Another option may be to combine a) and b) and only perform b) if the message is early identified as a critical message c. The relays may directly relay the message on the next transmission event, even if it is the next time-slot, on a symbol-by-symbol basis assuming that the relay will not decode the critical messages and it will, at best, re-generate the IQ samples of the detected symbols; one option can be regenerating samples based on the used modulated constellation.

d. Relays can continuously/repeatedly relay the critical message until either the decrementing time-to-live counter is still non-zero or the maximum possible delay is still not approached.

All vehicles/network nodes may keep a history of observed distribution of standard retransmissions or retransmissions of critical messages in order to learn with context about certain situations/trends.

A method for operating an apparatus configured to operate in a wireless communication network by generating and transmitting a first wireless signal using a resource element allocated to the apparatus in accordance with an embodiment comprises determining that the second wireless signal is to be forwarded within the wireless communication network using a received second wireless signal, and comprises transmitting a third wireless signal based on the second wireless signal instead of the first wireless signal using the allocated resource element of the wireless communication network.

A method for operating an apparatus configured to operate in a wireless communication network by generating and transmitting a first wireless signal using a resource element allocated to the apparatus in accordance with an embodiment comprises generating and transmitting a sidelink signal through a sidelink channel of the wireless communication network, the sidelink signal indicating a request that the first wireless signal is to be forwarded by a receiving node that is different from the intended receiver of the first wireless signal.

A method for operating a base station configured to operate a wireless communication network cell by allocating resource elements to an apparatus operated by the base station in accordance with an embodiment comprises receiving, from an apparatus, a request for a first amount of resource elements for own communication. The method further comprises allocating, to the apparatus, a second amount of resource elements, wherein the second amount is higher when compared to the first amount. The method further comprises feedbacking the second amount to the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method comprising:
   generating a first signal, wherein the first signal is transmitted using a resource element;
   receiving an incoming message,
   determining if the incoming message is critical; and
   transmitting the first signal if the incoming message is not critical; and
   transmitting a second signal using the resource element if the incoming message is critical; and
   successfully decoding a signaling field of the incoming message.

2. The method of claim 1, wherein the second signal is a sidelink signal.

3. The method of claim 1, wherein the resource element is part of a sidelink channel.

4. The method of claim 1, wherein the determining is based on a criticality indicator in the signaling field.

5. The method of claim 1, further comprising receiving an over-provisioned resource allocation of resource elements.

6. The method of claim 5, wherein an over-provisioned resource allocation comprises more resource elements than needed for transmission.

7. The method of claim 1, wherein the resource element is the earliest available transmission slot following the reception of the incoming message.

8. The method of claim 1, wherein a content of the second signal is bases on the incoming message.

9. A computer program stored on a non-transitory medium, wherein the computer program when executed on a processor performs the method as claimed in claim 1.

10. A device, comprising: a communication circuit comprising a transmitter circuit and a receiver circuit;
    a controller circuit;
    a memory circuit,
    wherein the memory circuit is arranged to store instructions,
    wherein the controller circuit is arranged to generate a first signal,
    wherein the first signal is transmitted using a resource element;
    wherein the communication circuit is arranged to receive an incoming message,
    wherein the controller circuit is arranged to determine if the incoming message is critical,
    wherein the controller circuit is arranged to transmit the first signal if the incoming message is not critical,
    wherein the controller circuit is arranged to transmit a second signal if the incoming message is critical
    wherein the controller circuit is arranged to decode a signaling field of the incoming message.

11. The device of claim 10, wherein the second signal is a sidelink signal.

12. The device of claim 10, wherein the resource element is part of a sidelink channel.

13. The device of claim 10, wherein the determining is based on a criticality indicator in the signaling field.

14. The device of claim 10, controller circuit is arranged to receive an over-provisioned resource allocation of resource elements.

15. The device of claim 14, wherein an over-provisioned resource allocation comprises more resource elements than needed by the device for transmission.

16. The device of claim 10, wherein the resource element is the earliest available transmission slot following the reception of the incoming message.

17. The device of claim 10, wherein a content of the second signal is bases on the incoming message.

* * * * *